United States Patent Office 3,746,763
Patented July 17, 1973

3,746,763
TWO-STEP HYDROGENATION OF LYSINE AMIDE PRECURSORS
Robert Fuhrmann, Morris Plains, and John Pisanchyn, Morristown, N.J., assignors to Allied Chemical Corporation, New York, N.Y.
No Drawing. Filed Dec. 29, 1971, Ser. No. 215,960
Int. Cl. C07c 103/00
U.S. Cl. 260—561 A                    18 Claims

ABSTRACT OF THE DISCLOSURE

A process for the preparation of D,L,-lysine amide by the two-step hydrogenation of 2-oximino-6-nitrohexanamide. In the first step, 2-oximino-6-aminohexanamide is produced as an intermediate, and claimed as a new product. Water is removed from the reaction products of the first step, and in the second step the intermediate 2-oximino-6-aminohexanamide is hydrogenated to D,L,-lysine amide.

CROSS REFERENCES TO RELATED APPLICATIONS

This application is related to co-pending applications Ser. Nos. 852,947 and 852,881, both filed Aug. 25, 1969, Ser. No. 97,290, filed Dec. 11, 1970, and Ser. No. 189,365, filed Oct. 14, 1971.

BACKGROUND OF THE INVENTION

(I) Field of the invention

This application relates to a novel catalytic method of hydrogenating the D,L,-lysine precursor, 2-oximino-6-nitrohexanamide to produce lysine amide. The hydrogenation is carried out in two steps, the first producing a new product, 6-amino-2-oximinohexanamide, as an intermediate. This new partially hydrogenated compound is also a precursor of D,L,-lysine. The second step comprises the further hydrogenation of this intermediate to produce D,L,-lysine amide. Lysine amide may be readily hydrolyzed to produce D,L,-lysine.

L-lysine (2,6-diamino-hexanoic acid) is a dibasic amino acid essential to life, and is therefore in increasing demand as a food supplement. In recent years synthetic methods of producing D,L,-lysine have been growing in importance. Although lysine is generally obtained as a mixture of two optical isomers (D and L-lysine), only L-lysine is metabolized, and is the desired optical isomer.

(II) Description of the prior art

There are many known routes to the production of D,L,-lysine. Several of these involve the catalytic hydrogenation of various precursors but quite frequently low yields in this reduction step render the methods costly and impractical.

SUMMARY OF THE INVENTION

In our co-pending application, Ser. No. 97,290, filed Dec. 11, 1970, the D,L,-lysine precursor 2-oximino-6-nitrohexanamide, also known as 2-oximino-6-nitrocapro-amide, was disclosed; and in co-filed application, Ser. No. 215,962, filed Dec. 29, 1971, a one-step method of hydrogenating the 2-oximino-6-nitrohexanamide to produce D,L,-lysine amide was disclosed.

In the latter application it was noted that water is formed during the hydrogenation and that water is conducive to the development of side reactions and their products, at the expense of the desired product, D,L,-lysine amide. It has now been found that if a hydrogenation is carried out in a pressure vessel as was done in the case of co-filed application Ser. No. 215,962, using the same reactants, catalyst and liquid ammonia as a solvent, but with the exception that a dialkyl ether of a polyol is additionally included in the reaction mixture, such as ethylene glycol dimethyl ether, the product of the hydrogenation is not lysine amide, but a new compound; namely, partially hydrogenated 2-oximino-6-aminohexanamide. This intermediate is also a precursor of D,L,-lysine amide and may be structurally represented as:

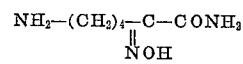

This intermediate can be separated as a substantially pure crystalline compound, and when this product is subjected to further hydrogenation in a manner very similar to that employed in co-filed patent application, Ser. No. 215,962, for the hydrogenation of 2-oximino-6-nitrohexanamide, lysine amide is obtained as a product in exceptionally good yield. Pipecolinamide is also present as a by-product, but in a much smaller amount than is the case when the hydrogenation is carried out in one step using only liquid $NH_3$ or carboxylic acid solvents.

We have previously indicated in our co-filed application, Ser. No. 215,962, that the ability to reduce 2-oximino-6-nitrohexanamide in good yield is quite unexpected, for although there is a wealth of data on the reduction of the individual functional groups, $-NO_2$, oxime and $-CONH_2$, it is quite surprising to be able to reduce the compound 2-oximino-6-nitrohexanamide which has all three reactive functional groups present on the molecule in relatively close proximity. The position of these functional groups in the molecule determines the ease of intramolecular reactions as opposed to intermolecular reactions. In view of the prior art, there are a number of reactions that could reasonably be expected to take place if an attempt where made to hydrogenate such a molecule, and it would normally be supposed that the reduction reaction to produce lysine amide involving a hydrogenation procedure would be impractical because of the production of ring compounds and side reaction products. It might well have been assumed from an examination of the literature, that lysine amide, if obtainable at all, would be found in impractically small amounts. Surprisingly, we have found a method of catalytically reducing 2-oximino-6-nitrohexanamide in two steps which suppresses the production of the unwanted compounds normally expected and permits the production of lysine amide in yields of 95% of theory or better.

In the production of the new intermediates 6-amino - 2 - oximinohexanamide from 2 - oximino - 6-nitrohexanamide, we use, in addition to hydrogen gas, a hydrogenation catalyst and anhydrous ammonia; a dialkyl ether of a polyol such as ethylene glycol dimethyl ether. Without the use of the latter organic solvent the product would be predominantly D,L,-lysine amide with substantial amounts of by-product pipecolinamide. The use of ammonia is important to the successful reduction of the 2-oximino-6-nitrohexanamide, and rather unexpected, for many catalytic systems previously developed for the hydrogenation of lysine amide precursors or for the hydrogenation of simple oximes do not give satisfactory results with this substrate. The use of the dialkyl ether of a polyol (which term is meant to include diols) is important to the production of the new intermediate, 2-oximino-6-aminohexanamide, for with the use of such a polyether, which serves to limit the extent of the reduction, this intermediate is obtained in almost quantitative yield rather than D,L,-lysine amide. Although D,L,-lysine amide is the product sought, we have found that by first isolating the new, partially hydrogenated, intermediate we are thus able to reduce the water content of the reaction mixture, the presence of which, is conducive to the production of side reactions and by-products. Thus, in the second stage hydrogenation of the isolated intermediate 2-oximino-6-aminohexanamide, we obtain the desired D,L,-lysine amide product in exceptionally good yield and with a minimum of by-product formation. Other methods of removing water from the reaction product of the first hydrogenation step may be employed advantageously such as by adding a solvent with which water forms an azeotrope, and removing the water by distillation.

In the second step of the hydrogenation, which is carried out in the presence of a hydrogenation catalyst and hydrogen, the dimethyl ether of a polyol is not present, nor is ammonia. In this step, however, a carboxylic acid is introduced. Examples of suitable carboxylic acids are: acetic, formic, propionic, isobutyric, and neopentanoic acids. The carboxylic acid chosen should be substantially anhydrous, since as previously noted, the presence of moisture tends to increase the ratio of by-product to product formation. Glacial acetic acid is the preferred carboxylic acid. During the production of lysine amide by the method of this invention, it is preferable to exclude oxygen in order to prevent solubilization of the catalyst with attendant metallic contamination of the lysine amide product.

D,L,-lysine amide is a valuable product in its own right and may be resolved to obtain L-lysine amide, which is substantially equivalent, nutritionally, to L-lysine. On the other hand, if desired, the D,L,-lysine amide may be readily hydrolyzed to produce D,L,-lysine.

DESCRIPTION OF THE PREFERRED EMBODIMENT

An agitated pressure reaction vessel is charged with 100 parts by weight of 2-oximino-6-nitrohexanamide and about 1 to 300 parts, preferably about 1 to 30 parts, of a noble metal hydrogenation catalyst comprising preferably about 1 to 20% of the noble metal catalytic agent on a support such as carbon, barium sulfate, titanium oxide, alumina, or thorium oxide. Preferably rhodium, palladium, or platinum supported on carbon may be used, or a mixture of both catalysts in any proportion to give the desired total catalyst charge. Whether or not these catalysts are supported is not critical to this hydrogenation. Furthermore, when a supported catalyst is used, selection of the support or the percent of platinum, rhodium or palladium on the support is also not critical. Other catalysts can also be used. In addition, between 100 and 10,000 parts, preferably between 500 and 6,000 parts of a dialkyl ether of a polyol is added to the mixture. Examples of such polyols (including diols) are ethylene glycol dimethyl ether, ethylene glycol diethyl ether, ethylene glycol dibutyl ether, diethylene glycol dimethyl ether, diethylene glycol diethyl ether, diethylene glycol dipropyl ether, diethylene glycol dibutyl ether, 1,3-dimethoxypropane, 1,2-dimethoxypropane, and 1,2-dimethoxybutane; ethylene glycol dimethyl ether being preferred.

Preferably, the reaction vessel is purged with an inert gas such as nitrogen, then cooled. About 200 to 10,000 parts, preferably 350 to 2,000 parts of anhydrous ammonia are charged into the reactor. The reactor is now pressurized with hydrogen gas to between 50 and 15,000 p.s.i.g., preferably between 10 and 3,000 p.s.i.g. The reactor is sealed, the agitator started, and the temperature of the charge brought to between 15 and 150° C., preferably between about 50 and 120° C. and maintained at the selected temperature with agitation for a period of between 0.1 to 20 hours, preferably for a period of about 1 to 10 hours. The reactor content is now cooled, preferably to about ambient temperature. The hydrogen and ammonia are vented and the charge filtered to separate the catalyst which may be washed and re-used in subsequent batches.

On standing, a crystalline product separates from the filtrate. The filtrate may be seeded if necessary, but generally this is not required. The crystalline product is filtered off and dried, preferably at between about 20 to 60° C. and preferably under partial vacuum. Water, which is conducive to the formation of side reaction products, remains in the filtrate, and is thus separated and removed prior to the second hydrogenation step. The formation of side reaction productions is thereby minimized in the second hydrogenation step, which is the point most susceptible to their production. The yield of D,L,-lysine amide is thereby correspondingly improved.

The crystalline product produced in the first hydrogenation step is predominantly 2-oximino-6-aminohexanamide, having a melting point between about 132 and 135° C. This partially hydrogenated intermediate serves as the raw material for the second stage of the hydrogenation. Generally, the second stage would be carried out in the same or similar apparatus as that employed in the first stage.

The pressure agitated reaction vessel is charged with 100 parts by weight of the intermediate, 2-oximino-6-aminohexanamide. About 1.0 to 300 parts, preferably between about 1.0 to 30 parts of one of the same catalysts as recommended for the first stage, such as 5% rhodium on carbon, is charged into the reactor together with between 50 and 5,000 parts, or preferably between 250 and 2,000 parts of glacial acetic acid or another anhydrous $C_2$–$C_6$ carboxylic acid. Raney Ni, Raney Co, or Raney Cu can also be used in this step if desired. The reactor is purged of air by means of an inert gas, then pressurized with hydrogen gas to between about 50 to 15,000 p.s.i.g., preferably between 1,000 and 3,000 p.s.i.g. The reactor is then sealed, the agitator started, and the contents heated to between 20 and 150° C, preferably between 50 and 120° C. and maintained at about the selected temperature with agitation for between about 1 to 20 hours, preferably for a period of about 3 to 15 hours. The reactor is then cooled, the hydrogen vented, and the reaction mixture filtered or decanted to separate the catalyst, which as in the case of the first step, may be washed and re-used a number of times in succeeding batches, if desired. The acetic acid is then evaporated, preferably under reduced pressure, and preferably at a temperature no greater than about 60° C. to obtain the crude lysine amide. If an aliquot sample of the product is hydrolyzed, esterified, and trifluoroacetylated, then subjected to gas liquid chromatography, the yield of the lysine amide is consistently found to be in the order of 95% of theory, the remainder being pipecolinamide by-product. The percentage composition of the crude product is substantially the same, since no unreacted 2-oximino-6-aminohexanamide remains.

EXAMPLE 1

The reactor employed in this example consists of a 3 ounce Fischer and Porter aerosol compatibility tube containing a Teflon-coated magnetic, externally activated and controlled, agitator. The reactor is charged with .176 gram of 2-oximino-6-nitrohexanamide, 0.0352 gram of a commercially available 5% rhodium on carbon hydrogenation catalyst (Engelhard) and 10 cubic centimeters (cc.) of ethylene glycol dimethyl ether (glyme). The reactor is purged with nitrogen gas to remove all traces of oxygen, cooled in a Dry-Ice acetone bath to about −77° C. and 2.19 grams of anhydrous ammonia charged into the reactor. The reactor is sealed, agitation is begun, and the temperature of the reactor charge is brought to, and maintained at, 60° C. with agitation, in a heated constant temperature silicone oil bath. After 10 minutes the reactor pressure is 123 p.s.i.g. The reactor is then pressurized with hydrogen to a total of 285 p.s.i.g., and maintained at 60° C. with agitation for 4 hours. It is then cooled to ambient temperature, vented, and the reaction mixture filtered on a medium glass fritted filter to remove the catalyst. The filtrate is subjected to thin layer chromatography and the solution of the crude hydrogenated product is subjected to chromatography using deactivated silica gel and ammonia-saturated glyme. The predominant product as indicated by thin layer chromatography is subjected to examination by infrared spectroscopy. The later examination indicates the material to be a partially hydrogenated intermediate 2-oximino-6-aminohexanamide.

EXAMPLE 2

This example is a repeat of Example 1. In this example the carbon, hydrogen, and nitrogen analyses, as well as the infrared and nuclear magnetic resonance spectra, indicate the isolated compound to be the partially hydrogenated intermediate 2-oximino - 6 - aminohexanamide. Mass spectra also confirms the identity of the isolated intermediate.

EXAMPLE 3

The reactor employed in this example consists of a Parr calorimeter bomb. Within the bomb is a Teflon-coated stirring bar, magnetically activated externally to provide any required degree of agitation. Heat is applied to the bomb by immersion in a constant temperature silicone oil bath.

The reactor is charged with 5.0 grams of 2-oximino-6-nitrohexanamide, 50 cc. of glyme, and 1.0 gram of a commercially available hydrogenation catalyst comprising 5% rhodium on carbon. After attaching the screw cap, the reactor is purged of air. This is done by pressurizing the bomb to about 15 p.s.i.g., then venting and repeating the procedure to a total of 5 pressurizations. The reactor is then cooled in a Dry Ice acetone bath to about $-77°$ C. and charged with a slight excess of anhydrous ammonia over the intended charge. This excess is vented, thus serving as a further purge of the system and leaving 18 grams of anhydrous ammonia as the charge. While still cold the reactor is pressurized with pure hydrogen gas to 340 p.s.i.g., then brought to 75° C. in a constant temperature silicone oil bath. It is maintained at this temperature with agitation for 6 hours. The reactor is then cooled to ambient temperature and the hydrogen and ammonia vented. The contents of the bomb is filtered on a medium glass fritted filter to separate the catalyst, thus leaving a clear colorless filtrate. Thin layer chromatography of the filtrate reveals only one compound with a development by Ninhydrin, copper nitrate, and shortwave ultraviolet. Substantially no 2-oximino-6-nitrohexanamide, lysine amide or pipecolinamide is found. On standing undisturbed overnight a crystalline mass is formed in the filtrate. Filtration and drying of the crystals in a vacuum oven at about 50° C. gives 2.50 grams of solids with a melting point of 132 to 135° C. IR and NMR spectra confirms the crystalline product to be the partially hydrogenated intermediate, 2 - oximino-6-aminohexanamide.

The reactor employed in the second stage of the hydrogenation consists of a 45 milliliter (ml.) Parr general purpose screw cap bomb fabricated of T-303 stainless steel model, #4712. Within the bomb is a Teflon-coated serrated piston-type agitator, magnetically activated externally, and controlled by a Wilson repeat-cycle timer.

The reactor is charged with 2.0257 grams of the partially hydrogenated intermediate 2-oximino-6-aminohexanamide which was obtained as the product in the first stage. 0.40 gram of 5% Rh on carbon and 10 cc. of glacial acetic acid is charged into the bomb. The screw cap is screwed in place and the reactor purged of air by 5 pressurizations with nitrogen to about 50 p.s.i.g. with venting after each pressurization, followed by 5 pressurizations with hydrogen to about 50 p.s.i.g., also venting after each successive pressurization. The reactor is then pressurized with hydrogen to about 1500 p.s.i.g., agitation is started and the reactor heated to 75° C., at which temperature it is maintained for 6 hours with agitation. Following this hydrogenation period the reactor is cooled to room temperature and the hydrogen vented. The reaction mixture is then filtered on a medium glass fritted filter to separate the catalyst. A clear colorless filtrate is obtained.

Thin layer chromatography applied to the filtrate indicates the hydrogenation product to contain 6 to 8% of pipecolinamide. No other by-product is found, the product being predominantly D,L,-lysine amide. The reaction is found to be substantially complete, there being no detectable amount of 2-oximino-6-aminohexanamide in the reaction mixture. A sample of the hydrogenation product after flash evaporation to remove the solvent is hydrolyzed, esterified, and trifluoroacetylated, then subjected to gas liquid chromatography.

The procedure for hydrolyzing, esterifying and trifluoroacetylating the crude lysine amide is briefly as follows: an aliquot sample of crude reaction product, weighing about 130 to 200 milligrams, is dried over $P_2O_5$, then charged into a 3 ounce Fischer and Porter aerosol compatibility tube and treated with 5 cc. of a 4 N solution of anhydrous HCl in methanol. A Teflon closure and Teflon valve is used and the magnetically controlled agitator is employed while the tube is heated in an oil bath for 1 hour at 100° C. Methanol is then flash-evaporated directly from the tube in a flash-evaporator. 8 cc. of methylene chloride and 2 cc. of trifluoroacetic anhydride are added to the contents of the tube which is then closed as before and agitated for 15 minutes until solution is substantially complete. Now the tube is heated to 150° C. for 10 min. then cooled, and to it is added from a pipette, a standard solution consisting of 3 cc. of 3% octadecane in toluene serving as an internal standard. The gas chromatograph employed:

F & M using 500 WX filaments
Column: 6 feet x ¼" stainless steel
SE–30—30% on Chromosorb W
Programmed temperature: 115 to 240° C. at 7.9°/min.
Injection temperature: 250° C.
Detector temperature: 350° C.
Helium flow: 105 cm.³/min.

Gas liquid chromatography shows the hydrogenated product to contain 94.6% lysine amide with the remainder being pipecolinamide.

EXAMPLE 4

Additional 2-oximino-6-aminohexanamide is prepared by the method given in Example 3 for the first stage. The second stage is also carried out in the same equipment as described in Example 3.

The reactor is charged with 1.0686 grams of the partially hydrogenated intermediate 2-oximino-6-aminohexanamide, 0.20 gram of 5% Rh on carbon and 5 cc. of glacial acetic acid. The reactor is purged of air as described in Example 3, then pressurized with hydrogen. The bomb is heated for 6 hours with agitation at 75° C. with an initial hydrogen pressure of 1700 p.s.i.g. After the hydrogenation, the reactor is cooled to ambient temperature and the hydrogen vented. The reaction mixture is filtered as before to remove the catalyst and a clear colorless solution is obtained. An aliquot sample of the hydrogenation product is subjected to flash-evaporation to remove the solvent. The portion remaining is hydrolyzed, esterified, and trifluoroacetylated, then subjected to gas-liquid chromatography. The sample shows the hydrogenated product to contain 95.5% lysine amide, and 2 to 3% pipecolinamide by weight.

It is not necessary to isolate the crystalline intermediate, 2-oximino-6-aminohexanamide, to remove water from the reaction mixture after the first hydrogenation step. For example, after the elimination of ammonia, water can be removed by adding and distilling off a solvent with which water forms an azeotrope. As an example, a solvent used in the first hydrogenation stage, such as dimethoxyethane (B.P. 83° C.), might be chosen, the water azeotrope of which boils at 76° C. and contains 10.5% water. After elimination of the water, the carboxylic acid can be added, and the hydrogenation continued in the presence of the dimethoxyethane. Alternately, the dimethoxyethane canbe easily separated from the carboxylic acid (B.P. 118° C.), by fractionation.

Since certain changes may be made in carrying out the above process, without departing from the scope of the invention, it is intended that all matter contained in the above description shall be interpreted as illustrative and not in a limiting sense.

We claim:

1. A process for the catalytic reduction of 2-oximino-6-nitrohexanamide to produce D,L,-lysine amide, comprising: subjecting 2-oximino-6-nitrohexanamide, an alkyl ether of a polyol having at least two alkyl ether groups, ammonia, and hydrogen in the presence of a hydrogenating catalyst, to superatmospheric pressure, at a temperature above 15° C., to produce a reaction product containing 2-oximino-6-aminohexanamide and water, removing water from the reaction product, and subjecting said 2-oximino-6-aminohexanamide together with a carboxylic acid and hydrogen in the presence of a hydrogenation catalyst, to superatmospheric pressure, at a temperature in excess of 15° C. to convert the 2-oximino-6-aminohexanamide intermediate to D,L,-lysine amide.

2. A process for the catalytic reduction of 2-oximino-6-nitrohexanamide to produce 2-oximino-6-aminohexanamide comprising: subjecting 2-oximino-6-nitrohexanamide, an alkyl ether of a polyol having at least two alkyl ether groups, ammonia and hydrogen in the presence of a hydrogenation catalyst, to superatmospheric pressure, at a temperature above 15° C., to convert the 2-oximino-6-nitrohexanamide into 2-oximino-6-aminohexanamide.

3. The process as claimed in claim 1 wherein said reaction is carried out in the absence of oxygen and the intermediate product is predominantly 2-oximino-6-aminohexanamide.

4. The process as claimed in claim 1 wherein the dialkyl ether of a polyol is added in the amount of between 1 and 100 times the weight of the 2-oximino-6-nitrohexanamide charge.

5. The process as claimed in claim 1 wherein the dialkyl ether of a polyol is the dialkyl ether of a diol.

6. The process as claimed in claim 1 wherein the dialkyl ether of a polyol is ethylene glycol dimethyl ether.

7. The process as claimed in claim 1 wherein the hydrogenation catalyst is chosen from the group consisting of the noble metals, rhodium, palladium, platinum, and mixtures thereof.

8. The process as claimed in claim 7 wherein the catalytic agent is deposited on a supporting material chosen from the group consisting of carbon, barium sulfate, titanium oxide, and thorium oxide, in an amount between 1 and 20%.

9. The process as claimed in claim 1 wherein the catalyst is present in an amount equal to between .01 and 3 times the weight of the 2-oximino-6-nitrohexanamide charge, and the hydrogenation is carried out with agitation for a period of between 0.1 and 20 hours, at a temperature between about 15 and 150° C.

10. The process as claimed in claim 1 wherein the catalyst is present in an amount equal to between 0.01 and 0.3 times the weight of the 2-oximino-6-nitrohexanamide charge.

11. The process as claimed in claim 1 wherein the ammonia is present in an amount equal to between 2.0 and 100 times the weight of the 2 - oximino - 6 - nitrohexanamide and the hydrogen gas is pressurized in the reactor to between 50 and 15,000 p.s.i.g.

12. The process as claimed in claim 1 wherein the ammonia is present in an amount equal to between 3.5 and 20 times the weight of the 2-oximino-6-nitrohexanamide and the hydrogen gas is pressurized to between 10 and 3,000 p.s.i.g.

13. The compound 6-amino - 2 - oximinohexanamide having the structural formula:

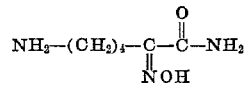

14. A method for the preparation of D,L,-lysine amide which comprises: subjecting 2-oximino-6-aminohexanamide together with a carboxylic acid and hydrogen in the presence of a hydrogenation catalyst, to superatmospheric pressure, at a temperature in excess of 15° C. to convert the 2-oximino-6-aminohexanamide to D,L,-lysine amide.

15. The process as claimed in claim 1 wherein the carboxylic acid is selected from the group consisting of acetic, formic, propionic, isobutyric, and neopentanoic acids, and is present in the amount of between 0.5 and 50 times the dry weight of the 2-oximino-6-aminohexanamide intermediate.

16. The process of claim 1 wherein the carboxylic acid is glacial acetic acid, and is present in the amount of between 2.5 and 20 times the dry weight of the 2-oximino-6-aminohexanamide intermediate.

17. The process as claimed in claim 14 wherein the hydrogenation catalyst is selected from the group consisting of the noble metals, rhodium, palladium, platinum, and mixtures thereof.

18. The process as claimed in claim 1 wherein the hydrogenation catalyst is selected from the group consisting of Raney Ni, Raney Co, and Raney Cu.

References Cited

UNITED STATES PATENTS 3,637,839   1/1972   Tanaka et al. ____ 260—561 A

FOREIGN PATENTS 1,203,540   8/1970   Great Britain _____ 260—561 R
1,226,893   3/1971   Great Britain _____ 260—561 R LEWIS GOTTS, Primary Examiner E. G. LOVE, Assistant Examiner U.S. Cl. X.R.
260—561 R, 293.52